Jan. 12, 1932.  G. A. CHUTTER  1,841,089
VOLTAGE CONTROL SYSTEM
Filed June 15, 1931
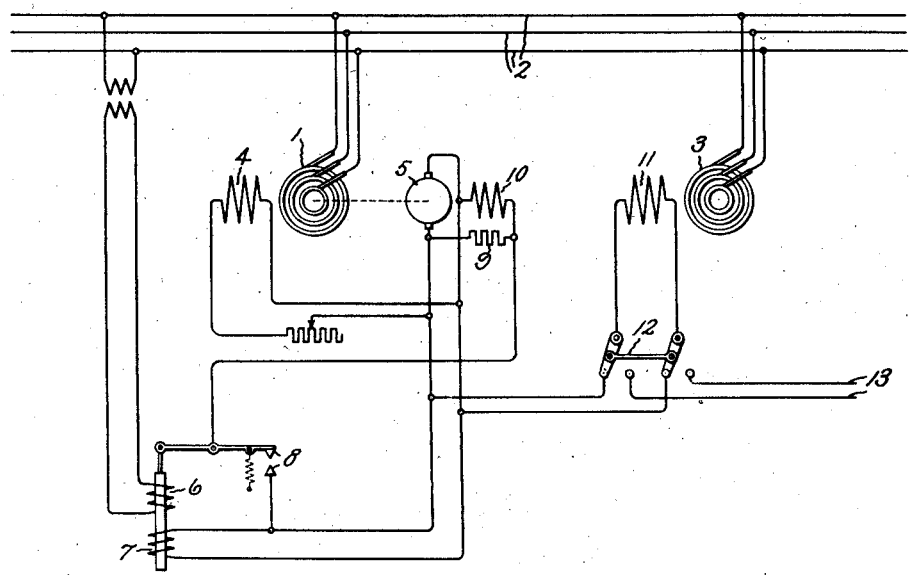
Inventor:
George A. Chutter:
by Charles E. Jullar
His Attorney.

Patented Jan. 12, 1932

1,841,089

UNITED STATES PATENT OFFICE

GEORGE A. CHUTTER, OF MILWAUKEE, WISCONSIN, ASSIGNOR TO GENERAL ELECTRIC COMPANY, A CORPORATION OF NEW YORK

VOLTAGE CONTROL SYSTEM

Application filed June 15, 1931. Serial No. 544,384.

My invention relates to voltage control systems and more particularly to a system for controlling the voltage of an arrangement comprising a synchronous generator which energizes a synchronous motor which is subjected to widely varying loads.

In systems where a synchronous generator is connected to a variable load it is customary to provide the generator with an automatic voltage regulator if the system is of any appreciable power capacity. This is because the voltage of a synchronous generator tends to vary widely with variations in both power output and power factor. If this voltage were not regulated it would be likely to attain such high values as to damage the insulation of the generator, or of the power circuit, or of the load itself. I have found that when the load on such a generator is a synchronous motor that the voltage of the system will vary widely with variations in load regardless of the action of the generator voltage regulator. This is due to the fact that the field excitation of the motor must be set for full load excitation, or above, so as to prevent the motor from pulling out of synchronism when full load, or overload, is applied to it. The result is that when the load on the motor decreases the motor operates overexcited, that is to say, it takes leading current from the generator, and, as is well understood by those skilled in the art, leading current in a synchronous generator produces an armature reaction therein which aids the action of the field excitation of the machine. As a result, under very light load conditions, the leading current taken by the motor may be so high as to supply more than the necessary excitation requirements of the generator with the result that the voltage regulator will be powerless to correct this condition and the voltage of the system may go considerably above normal.

A specific example of an arrangement in which this situation occurs is found in electrically driven excavator equipments which are used in mining and construction work. In such equipments, a synchronous generator is often driven by a Diesel engine and is electrically connected to the synchronous motor of the excavator, which in turn drives a direct current generator which, through a so-called Ward Leonard control, is connected to supply the direct current operating motor, or motors, of the excavator. In such equipments, the load varies rapidly and frequently between zero to as much as 100% overload in some cases. Under such circumstances, the voltage of the alternating current equipment will vary widely if the motor has a fixed field excitation regardless of whether the generator is connected to an automatic voltage regulator or not. This variation in voltage is not only likely to be injurious to the alternating current power apparatus, but is also likely to be injurious to any auxiliary devices which are energized from the synchronous generator, such for example as incandescent lamps which are used in connection with the excavator equipment.

In accordance with my invention I provide a voltage control arrangement, for a widely varying power transmitting alternating current system consisting of a synchronous generator connected to energize a synchronous motor, which comprises simultaneously varying the excitations of the synchronous machines in accordance with the operation of a voltage regulator which is connected to respond to the voltage of the alternating current system.

An object of my invention is to provide a novel and simple voltage control system.

Another object of my invention is to provide a voltage control system for simultaneously and similarly varying the excitations of a synchronous generator and a synchronous motor, which are electrically connected, whereby the variations in excitation are made in accordance with the voltage of the synchronous machines.

My invention will be better understood from the following description taken in connection with the accompanying drawing and its scope will be pointed out in the appended claims.

In the single figure of the accompanying drawing, wherein I have illustrated diagrammatically an embodiment of my invention, 1 is a synchronous generator which, it will be considered, is driven by any suitable source of power (not shown) and which is connected by a power circuit 2 to energize a synchronous motor 3 which, it will be assumed, is connected to a variable load (not shown). The generator 1 has a field winding 4 which is connected to be energized from any suitable source of current supply, such as a direct connected exciter 5. For regulating the voltage of generator 1, I may employ any one of a number of well known types of automatic voltage regulators and in the illustrated embodiment, I employ a vibratory contact type voltage regulator comprising a main control coil 6, which is connected to respond to the voltage of the generator 1, an anti-hunting coil 7, which is connected to respond to the voltage of exciter 5, and a pair of control contacts 8, which are operated by coils 6 and 7 and which are arranged to control the effective or average value of a regulating resistance 9 which is in circuit with the field winding 10 of the exciter 5.

The motor 3 has a field winding 11 which is normally connected through a switch 12 across the exciter 5, that is to say, it is connected in parallel with the field winding 4 of generator 1. The field winding 11 may also be energized from any suitable source of constant voltage supply, such as a supply circuit 13, by throwing switch 12 to the right. This may be desirable in cases or at times when the load for motor 3 is substantially constant.

The operation of the illustrated embodiment of my invention is as follows: Assume that generator 1 is being driven by a suitable source of power in the usual manner and that it is delivering power to motor 3, which is in turn supplying power to a load, which for the moment will be considered as being constant. Assume further that the voltage of circuit 2 is normal. Under these conditions and with the parts in the positions shown in the drawing, the resistance 9 will be in circuit with field 10 of the exciter 5 and consequently the voltage of exciter 5 will start to drop. As soon as it starts to drop, the pull of anti-hunting coil 7 is weakened and contacts 8 close, thereby short-circuiting resistance 9, which produces an increase in the excitation of field winding 10 and consequently an increase in the voltage of exciter 5. This results in an increased pull of anti-hunting coil 7 and a breaking of contacts 8. This action continues at a very rapid rate whereby the voltage of exciter 5 is kept at a substantially constant average value although its instantaneous value oscillates about this average value at a rapid rate. Due, however, to the relatively large inductance of field winding 4 of generator 1, the field current in this winding is substantially constant with a result that the voltage of machine 1 is substantially constant.

Assume now that the load on motor 3 increases. Assume also that machines 1 and 3 have been operating at unity power factor, that is to say, that motor 3 has been operating with normal excitation. The increase in load on motor 3 causes the voltage of circuit 2 to decrease for two reasons. The first is that the mere increase in load on the generator reduces its terminal voltage due to the increased impedance drop in the machine. The second reason is that as machine 3 has previously been operating with normal excitation and as its load has increased without an immediate corresponding increase in excitation, this machine will be now operating underexcited, that is to say, it will be taking a lagging current from generator 1 and the armature reaction produced by this lagging current in generator 1 is such as to oppose the field flux of the generator. As soon however as the voltage of circuit 2 decreases, the pull of control coil 6 of the regulator decreases with the result that the ratio of time open to time closed of contacts 8 changes in such a manner as to decrease the effective value of the resistance 9. This increases the average voltage of exciter 5 and consequently it increases the field current in windings 4 and 11. The result of the increase in excitation of machine 1 is obviously to increase its terminal voltage and the result of the increase in excitation of motor 3 is to increase its power factor and also its pullout torque.

Similarly, if the load on motor 3 decreases, this motor is likely to start operating overexcited and to take a leading current which will result in an increase in voltage of machine 1, quite independently of the additional voltage increasing factor which is due to the fact that the power delivered by this machine has decreased. Due, however, to the action of the voltage regulator, which by automatically varying the ratio of the time open to the time closed of the contacts 8 varies the effective value of resistance 9 in such a way as to restore the voltage to normal, this increase in voltage is checked.

I have found that with this arrangement the voltage regulation of the system is greatly improved over the ordinary system in which the field excitation of the synchronous motor is constant. Furthermore, this arrangement is practically indispensable if it is desired to hold the voltage down during very light load and no-load conditions.

While I have shown and described a particular embodiment of my invention, it will be obvious to those skilled in the art that changes and modifications may be made without departing from my invention, and I therefore aim in the appended claims to cover all such changes and modifications as fall within the true spirit and scope of my invention.

What I claim as new and desire to secure by Letters Patent of the United States, is:

1. In combination, a synchronous generator, a synchronous motor connected to be energized by said generator, and means responsive to the voltage of said generator for simultaneously varying the excitation of said generator and said motor.

2. In combination, a synchronous generator, a synchronous motor connected to be energized by said generator, an exciter, said generator and said motor each having a field winding connected to be energized by said exciter, and a voltage regulator for said generator arranged to vary the voltage of said exciter.

3. In combination, a synchronous generator, a synchronous motor connected to be energized by said generator, an exciter operated from said generator, said generator and said motor each having a field winding connected to be energized by said exciter, a voltage regulator connected to said generator and arranged to vary the voltage of said exciter.

4. In combination, a synchronous generator, a synchronous motor connected to be energized by said generator, means for controlling the excitations of said machines, and means for jointly controlling said excitation controlling means comprising a winding responsive to the terminal voltage of said generator and a winding responsive to the excitation voltage of said generator.

In witness whereof I have hereunto set my hand.

GEORGE A. CHUTTER.